(12) United States Patent
Gonciarz et al.

(10) Patent No.: US 8,511,957 B2
(45) Date of Patent: Aug. 20, 2013

(54) FASTENER FOR STUCCO OR HARD BOARD SUBSTRATES

(75) Inventors: Mark Edward Gonciarz, South Elgin, IL (US); Mark D. Latz, Chicago, IL (US); Donald J. Broomfield, Elgin, IL (US)

(73) Assignee: Illinoks Tool Works Inc., Glenview ( * ) Notice: Subject to any disclaimer, the term of this patent is extended or adjusted under 35 U.S.C. 154(b) by 1004 days.

(21) Appl. No.: 12/149,119

(22) Filed: Apr. 28, 2008

(65) Prior Publication Data

US 2009/0269164 A1    Oct. 29, 2009

(51) Int. Cl.
F16B 25/00 (2006.01)
(52) U.S. Cl.
USPC .......................... 411/386; 411/387.4; 411/418
(58) Field of Classification Search
USPC ............. 411/386, 387.1, 387.2, 387.3, 387.4, 411/387.5, 387.6, 387.7, 412, 417, 418
See application file for complete search history.

(56) References Cited

U.S. PATENT DOCUMENTS

| | | | | |
|---|---|---|---|---|
| 2,507,882 A | * | 5/1950 | Berman | 411/417 |
| 2,654,284 A | * | 10/1953 | Schevenell | 411/387.4 |
| 2,823,574 A | * | 2/1958 | Rosan | 411/386 |
| 3,045,523 A | * | 7/1962 | Reed | 411/387.1 |
| 3,207,023 A | | 9/1965 | Knohl | |
| 3,258,797 A | | 7/1966 | Budd | |
| 3,492,908 A | * | 2/1970 | Thurston | 411/418 |
| 3,517,581 A | * | 6/1970 | Stokes et al. | 411/387.8 |
| 3,661,194 A | | 5/1972 | MacFarlane et al. | |
| 3,942,406 A | * | 3/1976 | Egner | 411/418 |
| 4,034,641 A | | 7/1977 | Williams, Jr. et al. | |
| 4,430,036 A | | 2/1984 | Chapman | |
| 4,486,135 A | | 12/1984 | Kazino | |
| 4,637,767 A | | 1/1987 | Yaotani et al. | |
| 4,652,194 A | | 3/1987 | Tajima et al. | |
| 4,673,323 A | * | 6/1987 | Russo | 411/107 |
| 4,716,751 A | | 1/1988 | Wozniak | |
| 4,718,802 A | | 1/1988 | Rockenfeller et al. | |
| 4,793,219 A | | 12/1988 | Wozniak | |
| 4,793,220 A | | 12/1988 | Yamamoto et al. | |
| 4,820,098 A | | 4/1989 | Taubert et al. | |
| 4,842,467 A | | 6/1989 | Armstrong | |
| 5,044,853 A | | 9/1991 | Dicke | |
| 5,061,136 A | | 10/1991 | Dixon et al. | |
| 5,110,245 A | | 5/1992 | Hiroyuki | |
| 5,188,496 A | | 2/1993 | Giannuzzi | |
| 5,244,327 A | * | 9/1993 | Whitesell | 411/386 |
| 5,282,708 A | | 2/1994 | Giannuzzi | |
| 5,294,227 A | | 3/1994 | Forster et al. | |
| 5,385,439 A | | 1/1995 | Hurdle | |
| RE34,969 E | | 6/1995 | Dixon et al. | |
| 5,667,443 A | * | 9/1997 | Allen | 470/12 |
| 5,674,035 A | | 10/1997 | Hettich et al. | |

(Continued)

*Primary Examiner* — Victor Batson
*Assistant Examiner* — Caroline L Natirboff
(74) *Attorney, Agent, or Firm* — Law Office of Steven W. Weinrieb

(57) ABSTRACT

A self-tapping fastener, which has been especially constructed for use in connection with the insertion and installation thereof into stucco, gypsum, wallboard, or other hard board substrates, wherein the forward end portion of the shank portion of the self-tapping fastener is provided with a pair of diametrically opposed flat sections which effectively form at least one pair of diametrically opposed tapping threads so as to effectively perform the thread tapping process despite exhibiting some abrasion of the forwardmost threads. In addition, the flat sections also effectively define recessed pockets for accommodating any dust, particles, debris, or the like, which will be generated during the thread tapping process.

8 Claims, 2 Drawing Sheets

(56) References Cited

U.S. PATENT DOCUMENTS

| | | |
|---|---|---|
| 5,743,914 A | 4/1998 | Skiba |
| 5,827,030 A | 10/1998 | Dicke |
| 5,885,041 A | 3/1999 | Giannuzzi et al. |
| 5,897,280 A | 4/1999 | Dicke |
| 5,921,735 A | 7/1999 | Hughes |
| 5,957,646 A | 9/1999 | Giannuzzi et al. |
| 5,961,267 A | 10/1999 | Goss et al. |
| 6,045,312 A | 4/2000 | Hsing |
| 6,056,491 A | 5/2000 | Hsu |
| 6,086,302 A | 7/2000 | Gerhard |
| 6,176,664 B1 * | 1/2001 | Roberts ............ 411/387.1 |
| 6,250,866 B1 | 6/2001 | Devine |
| 6,254,327 B1 | 7/2001 | Chen |
| 6,296,433 B1 | 10/2001 | Forsell et al. |
| 6,340,277 B1 | 1/2002 | Koenig et al. |
| 6,419,435 B1 | 7/2002 | Gaudron |
| 7,140,825 B2 * | 11/2006 | Takahashi et al. ......... 411/387.8 |
| 2006/0251493 A1 * | 11/2006 | Buhl ............... 411/386 |

* cited by examiner

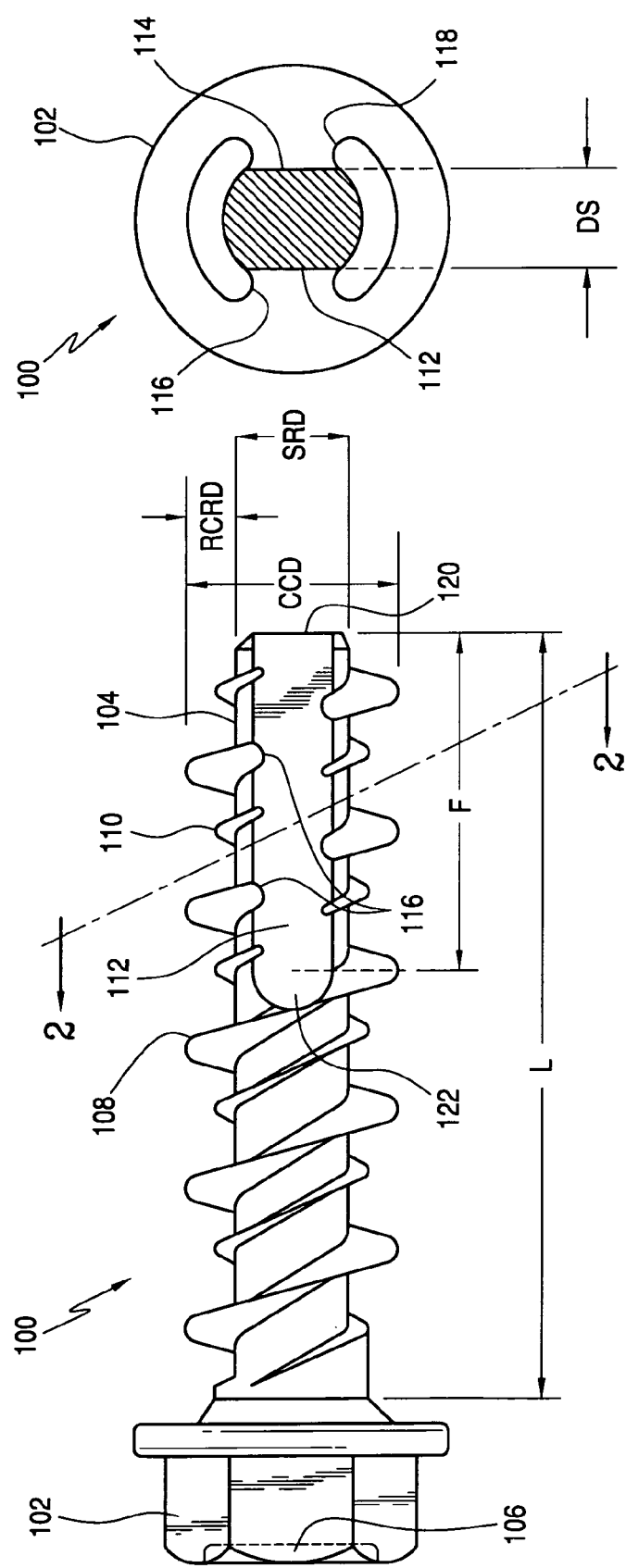

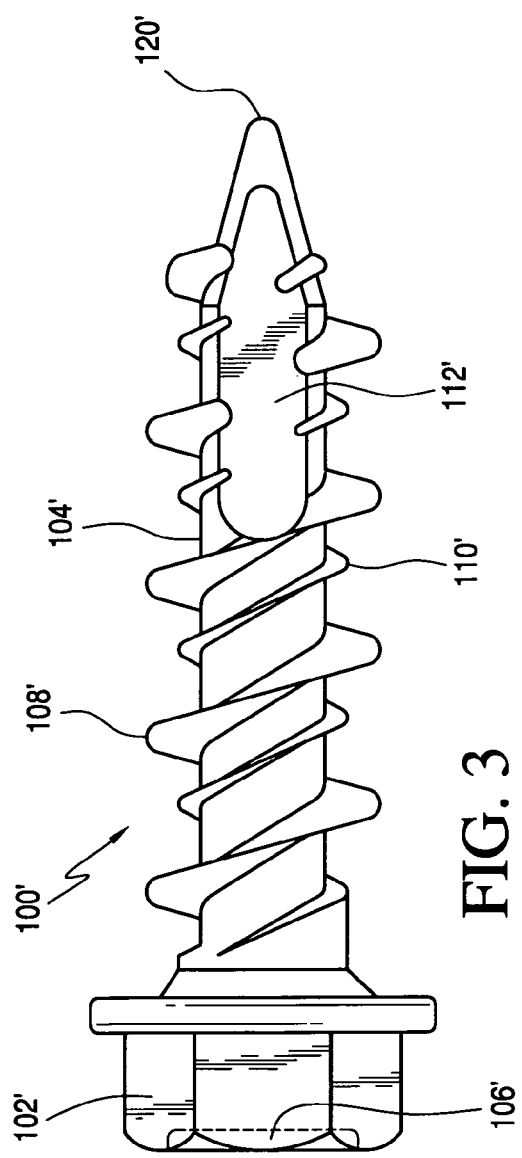
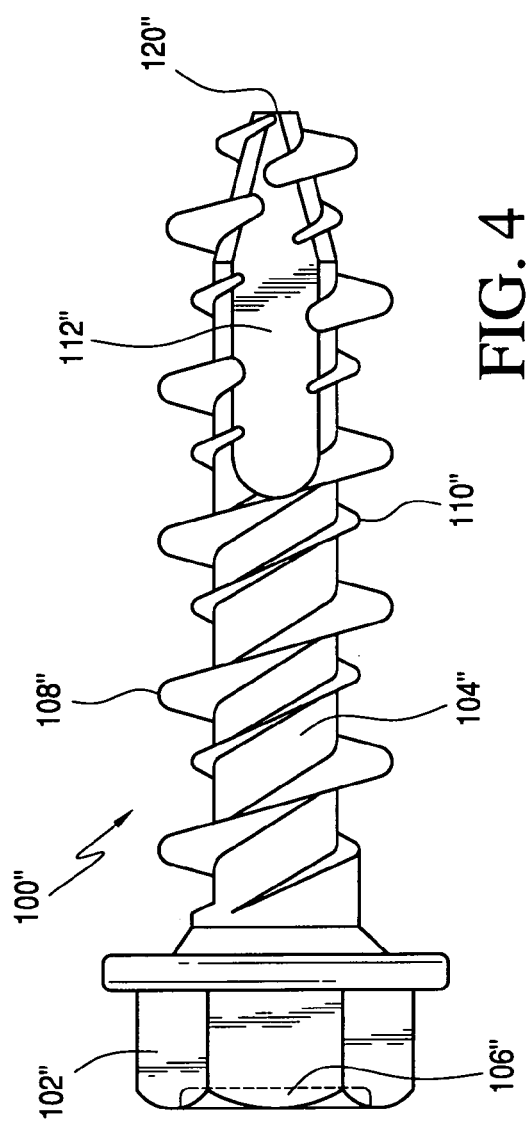

FASTENER FOR STUCCO OR HARD BOARD SUBSTRATES

FIELD OF THE INVENTION

The present invention relates generally to self-tapping fasteners adapted to be inserted into various different substrates, and more particularly to a new and improved self-tapping fastener, which has been especially constructed for use in connection with the insertion and installation thereof into stucco, gypsum, wallboard, or other hard board substrates, wherein the shank portion of the self-tapping fastener is provided with a dual thread structure comprising, in effect, a primary thread lead and a secondary thread lead, and wherein further, the forward end portion of the shank portion of the self-tapping fastener is provided with a pair of diametrically opposed flat sections which effectively form or define a pair of diametrically opposed cutting, tapping, or forming threads from the primary thread lead so as to effectively perform the thread cutting, tapping or forming process despite exhibiting some abrasion of the forwardmost primary thread lead portions of the self-tapping fastener as a result of the self-tapping process. In addition, the flat sections will also effectively accommodate any dust, particles, debris, or the like, which will be generated during the thread tapping process until, for example, the forward end or tip portion of the self-tapping fastener pierces the back or inner side surface of the stucco, gypsum, wallboard, or other hard board substrate, whereby such dust, particles, debris, or the like, can then be discharged from the back or inner side of the stucco, gypsum, wall board, or other hard board substrate.

BACKGROUND OF THE INVENTION

Various self-tapping fasteners are of course well-known in the art and are utilized for use within different substrates, to achieve different objectives, and the like. In connection with the installation of self-tapping fasteners into stucco, gypsum, wallboard, or some other types of hard board substrates, abrasion of the self-tapping threads can sometimes pose a problem. In addition, in connection with the installation of self-tapping fasteners into substrates, such as, for example, stucco, gypsum, wallboard, or other types of hard board substrates, a considerable amount of dust, particles, debris, or the like is usually generated during the self-tapping process. In order to achieve desirable installation parameters, characteristic, for example, of the particular self-tapping fasteners installed within the particular substrates, such as, for example, a particularly desirable pull-out resistance or force, it is desirable that the root diameter of the particular self-tapping fastener is closely matched or toleranced with respect to the diameter of the bore which has been pre-drilled into the substrate and into which the self-tapping fastener is to be installed as a result of the self-tapping process. Under these circumstances, however, the aforenoted generation of the dust, particles, debris, or the like, during the self-tapping process, may pose a problem in connection with the performance and completion of the self-tapping process in view of the fact that no substantial clearance is effectively provided or defined between the root diameter of the self-tapping fastener and the internal peripheral wall surface of the bore pre-drilled into the substrate and into which the self-tapping fastener is to be installed as a result of the self-tapping process.

A need therefore exists in the art for a new and improved self-tapping fastener which is particularly structured for a self-tapping installation process within, for example, stucco, gypsum, wallboard, or other hard board surfaces, wherein, despite, for example, the abrasive nature of the particular substrate, the self-tapping process can be readily and completely performed by the fastener, the installed fastener will exhibit desirable pull-out resistance values or forces, and wherein dust, particles, debris, or the like, generated during the self-tapping process, can be accommodated until, for example, the forward end or tip portion of the self-tapping fastener pierces the other or back side of the substrate whereby the accumulated dust, particles, or debris can be discharged.

SUMMARY OF THE INVENTION

The foregoing and other objectives are achieved in accordance with the teachings and principles of the present invention through the provision of a new and improved a self-tapping fastener which has been especially constructed for use in connection with the insertion and installation thereof into stucco, gypsum, wallboard, or other hard board substrates. The self-tapping fastener comprises a shank portion which is provided with a dual thread structure comprising, in effect, a primary thread lead and a secondary thread lead, and the forward end portion of the shank portion of the self-tapping fastener is provided with a pair of diametrically opposed flat sections which effectively form or define a pair of diametrically opposed cutting, tapping, or forming threads from the primary thread lead.

In this manner, despite encountering or undergoing some abrasion of the forwardmost primary thread lead portions of the self-tapping fastener as a result of the self-tapping process within the particular substrate, the thread cutting, tapping or forming process can nevertheless be performed and completed such that the self-tapping fastener will exhibit good pull-out resistance or force values, characteristics, or parameters. In addition, the flat sections will also effectively accommodate any dust, particles, debris, or the like, which will be generated during the thread tapping process depending upon the particular substrate into which the self-tapping fastener is being inserted and installed, until, for example, the forward end or tip portion of the self-tapping fastener pierces the back or inner side surface of the stucco, gypsum, wallboard, or other hard board substrate, whereby such dust, particles, debris, or the like, can then be discharged from the back or inner side of the stucco, gypsum, wall board, or other hard board substrate.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 1 is a side elevational view of the new and improved self-tapping fastener as constructed in accordance with the principles and teachings of the present invention;

FIG. 2 is a cross-sectional view of the new and improved self-tapping fastener as disclosed within FIG. 1 and as taken along the lines 2-2 of FIG. 1;

FIG. 3 is a side elevational view of a first modified embodiment of the new and improved self-tapping fastener as disclosed within FIG. 1; and FIG. 4 is a side elevational view of a second modified embodiment of the new and improved self-tapping fastener as disclosed within FIG. 1.

DETAILED DESCRIPTION OF THE PREFERRED EMBODIMENT

Referring now to the drawings, and more particularly to FIGS. 1 and 2 thereof, a new and improved self-tapping fastener, as constructed in accordance with the principles and teachings of the present invention, is disclosed and is generally indicated by the reference character 100. More particularly, it is seen that the new and improved self-tapping fastener 100 is seen to comprise a head member 102 and a shank portion 104. The head member 102 can have any conventional structure or cross-sectional configuration, however, a hexagonal cross-sectional configuration is illustrated. In addition, the head member 102 may be provided with a suitable recess, slot, or the like, 106 to receive, for example, a conventional screw driver blade, a Philips head type screw driver blade, or the like. The basic structure of the self-tapping fastener 100 may be conventional in that the same may be, for example, a ¼×15×1½ type self-tapping fastener, although, of course, the unique and novel aspects of the present invention, as will be discussed shortly hereinafter, are applicable to other conventionally structured self-tapping fasteners. In the case of the exemplified a ¼×15×1½ type self-tapping fastener, this means, for example, that the self-tapping fastener 100 has an external diameter CCD, as measured from thread crest to opposite thread crest of ¼ inch (0.250"), it has a thread pitch of fifteen threads per inch (15 tpi), and the shank portion 104 thereof has an axial length L of one and one-half inches (1.500"). The self-tapping fastener 100 is adapted to be inserted and installed within a suitable substrate, such as, for example, stucco, gypsum, wallboard, or other hard board, and if, for example, the stucco substrate has a thickness dimension of three-quarters of an inch (0.750"), then the axial length L of the shank portion 104 of the self-tapping fastener 100 should be, for example, at least one inch (1.000"), and preferably, as has been noted, one and one-half inches (1.500") so as to effectively provide the self-tapping fastener 100 with a pull-out resistance value, or a pull-out resistance force, of, for example, approximately four hundred pounds (400#), as will become more apparent hereinafter.

Continuing further, it is also seen that the thread of the illustrated self-tapping fastener 100 comprises a dual-thread structure comprising a first or primary thread lead 108 and a second or secondary thread lead 110. Except at the extreme end portions of the shank 104, it is seen that each one of the threads of the first or primary thread lead 108 is inter-posed between a pair of threads of the second or secondary thread lead 110 so as to be equidistantly spaced from the pair of threads of the second or secondary thread lead 110, and conversely, each one of the threads of the second or secondary thread lead 110 is interposed between a pair of threads of the first or primary thread lead 108 so as to be equidistantly spaced from the pair of threads of the first or primary thread lead 108. The serially spaced threads of the first or primary thread lead 108 therefore have the same pitch as the pitch of the serially spaced threads of the second or secondary thread lead 110, and since the thread pitch of the self-tapping fastener 100 is fifteen threads per inch (15 tpi), which includes both the threads of the first or primary thread lead, as well as the threads of the second or secondary thread lead, then it will be appreciated that there will be approximately seven (7) threads of the first or primary thread lead 108 per inch, and approximately seven (7) threads of the second or secondary thread lead 110 per inch.

Continuing still further, in order to provide the self-tapping fastener 100 with the aforenoted pull-out resistance value or pull-out resistance force of approximately four hundred pounds (400#), it is to be noted that when the self-tapping fastener 100 is to be inserted and installed within the particular substrate, the substrate is initially provided with a bore hole wherein the internal peripheral surface portion of the bore hole has a diametrical extent which is closely matched or closely toleranced with respect to the shank root diameter SRD of the self-tapping fastener 100. In this manner, the thread profile of the self-tapping fastener 100 can effectively have or exhibit approximately one hundred percent (100%) thread engagement within the substrate. More particularly, since we know that the crest-to-crest external diameter (CCD) of the self-tapping fastener 100 is preferably one-quarter of an inch (0.250"), although the particular external diameter dimension could vary within the range of, for example, 0.245-0.251", and since we also know that the root-to-crest radial dimension (RCRD) is approximately 0.041", which would therefore comprise a composite diametrical dimension of approximately 0.082" then we determine that the shank root diameter SRD is approximately 0.169"although such shank root diameter SRD could be within the range of 0.163-0.169" when, for example, the crest-to-crest external diameter (CCD) varies within the range of 0.245-0.251". Accordingly, the bore, initially provided within the substrate by means of a suitable drill bit, and into which the self-tapping fastener is to be inserted and fully installed, should have an internal diametrical extent which is within the range of approximately 0.170-0.176" such that the clearance between the internal peripheral surface of the drilled bore and the external peripheral surface portion of the shank portion 104 of the self-tapping fastener 100 will be within the range of approximately 0.001-0.013". It is of course to be appreciated that with differently sized self-tapping fasteners 100, having, for example, different root diameter dimensions RD, different drills, for drilling different bores having different internal diameter dimensions, will be utilized.

Continuing further, it has been previously noted that particular substrates, such as, for example, stucco, can be somewhat abrasive in connection with the insertion and installation of self-tapping fasteners therewithin. Accordingly, during the self-tapping process, the self-tapping thread formed or defined upon the self-tapping fastener will tend to be somewhat abraded which can adversely affect the pull-out resistance or pull-out force parameters characteristic of the self-tapping fastener when inserted and installed within the stucco substrate. In addition, it has also been noted that when a self-tapping fastener is in fact inserted and installed within certain substrates, such as, for example, stucco, a substantial amount of dust, particles, debris, or the like will in all likelihood be generated. Therefore, it is desirable that such generated dust, particles, debris, or the like be physically accommodated and ultimately dispensed or discharged in order to effectively prevent any interference or obstruction in connection with axial advancement of the self-tapping fastener into the drilled bore. In reality, what actually conventionally happens, as the self-tapping fastener begins to form or cut the female threads upon or within the internal peripheral surface of the circumferential wall defining the drilled bore, is that the dust, particles, or debris begins to accumulate within the annular spaces defined between the external circumferential surface portions of the shank portion of the self-tapping fastener, which are defined between the successive male threads of the self-tapping fastener, and the internal peripheral wall surface of the drilled bore.

The accumulation of the dust, particles, debris, or the like, then effectively increases the coefficient of friction developed between the male threads of the self-tapping fastener and the female threads formed or cut upon or within the internal peripheral surface of the circumferential wall defining the drilled bore, therefore substantially slowing or retarding the axial progression of the self-tapping fastener within and through the bore drilled within the substrate. Ultimately, due to such slowing or retarding of the axial progression of the self-tapping fastener within or through the bore drilled within the substrate, the male threads of the self-tapping fastener, instead of progressively cutting or forming the female threads upon or within the internal peripheral surface of the circumferential wall defining the drilled bore, will effectively keep cutting or forming the female threads within or upon substantially the same or extended regions of the internal peripheral surface of the circumferential wall defining the drilled bore such that the cut or formed female threads are oversized or are effectively stripped.

Therefore, in accordance with the principles and teachings of the present invention, as can be appreciated from FIGS. 1 and 2, a pair of axially oriented radially inwardly recessed flats 112,114 are respectively formed or defined upon diametrically opposite side surface portions of the shank portion 104 of the self-tapping fastener 100 prior to the rolling of the first or primary and second or secondary threads 108,110 upon the shank portion 104. As a result of this overall flat-forming and thread rolling process, the recessed flats 112,114 serve two important functions. Firstly, due to the presence of the recessed flats 112,114 upon the diametrically opposite side surface portions of the shank portion 104 of the self-tapping fastener 100, both the first or primary and second or secondary threads 108,110 are effectively interrupted or rendered discontinuous within those regions of the threads 108, 110 which effectively encounter or intersect the pair of flats 112,114. In this manner, at least one pair of diametrically opposite cutting, forming, or self-20 tapping threads 116,118 are effectively formed upon diametrically opposite sides of the self-tapping fastener 100 so as to perform the female thread cutting or forming operation within the drilled bore of the substrate. In fact, it is preferable that the axially oriented flats 112,114 have an axial length dimension F such that, in accordance with the predetermined pitch, characteristic of the threads of the first or primary and second or secondary thread leads 108,110 as disposed upon the shank portion 104 of the self-tapping fastener 100, at least two axially spaced threads of the first or primary thread lead 108 will in effect encounter or intersect the diametrically opposed pair of flats 112,114 such that, in effect, two pairs of the axially spaced and diametrically opposed forming, cutting, or self-tapping threads 116,118 are formed upon the self-tapping fastener 100 as well as undercut portions located between each of the diametrically opposed forming, cutting, or self-tapping threads and the diametrically opposed pair of flats. In this manner, a sufficient number of the forming, cutting, or self-tapping threads 116,118 are provided upon the self-tapping fastener 100. In particular, as a result of the formation of a single pair of the diametrically opposed cutting or forming threads 116, 118, the self-tapping fastener 100 has inherent redundancy in connection with the provision of its cutting or forming threads 116,118, and preferably, in view of the provision of the two pairs of the diametrically opposed cutting or forming threads 116,118 as formed upon the self tapping fastener 100, or in other words, wherein the self tapping fastener 100 is provided with four cutting or forming threads 116,118, such redundancy, in the case of a single pair of the diametrically opposed cutting or forming threads 116,118, or such dual redundancy in the case of the dual pair of diametrically opposed cutting or forming threads 116,118, will effectively compensate for any abrasion that such cutting, forming, or self-tapping threads 116,118 will be subjected to by means of the particular substrate, such as, for example, stucco, during the thread cutting, forming, or self-tapping process, whereby good and proper female threads will in fact be cut, formed, or tapped within the substrate.

In connection with the formation of the diametrically opposed flats 112,114 upon the diametrically opposed side surface portions of the shank portion 104 of the self-tapping fastener 100, it is to be noted that the radial depth of the diametrically opposed flats 112,114, and therefore, correspondingly, the radially outward projection of the cutting or forming threads 116,118, is a function of the particular material being tapped, such as, for example, the gypsum, stucco, hard board, or the like. Accordingly, the diametrical spacing DS as defined between the diametrically opposed flats 112, 114 may be, for example, within the range of 35-65% of the maximum thread diameter CCD characteristic of the self-tapping fastener 100. It is also noted that the pair of diametrically opposed flats 112,114 extend rearwardly from the forward end or tip portion 120 of the self-tapping fastener 100 and eventually terminate at a transitional region which again smoothly connects the pair of oppositely disposed flats 112, 114 to one of the threads of the first or primary thread lead 108.

The second purpose or function of providing the pair of diametrically opposed flats 112,114 upon the diametrically opposite side portions of the shank portion 104 of the self-tapping fastener 100 is that such flats 112,114 effectively define pockets or recesses which permit any dust, particles, debris, or the like, generated during the thread cutting, forming, or tapping process, to be physically accommodated whereby such dust, particles, debris, or the like, will not in fact interfere with or obstruct the axial progression of the self-tapping fastener 100 into and through the bore drilled within the substrate during the thread cutting, forming, or tapping process. More particularly, as a result of the physical accommodation of the dust, particles, debris, or the like, within the flat regions 112,114 of the self-tapping fastener 100, the dust, particles, debris, or the like, generated during the thread cutting, forming, or tapping process, will not tend to accumulate within the annular spaces defined between the external circumferential surface portions of the shank portion of the self-tapping fastener 100, which are defined between the successive male threads 108 of the self-tapping fastener 100, and the internal peripheral wall surface of the drilled bore. Therefore, the coefficient of friction developed between, for example, the male threads 108 of the self-tapping fastener 100 and the female threads formed or cut upon or within the internal peripheral surface of the circumferential wall defining the drilled bore, will not be increased whereby the axial progression of the self-tapping fastener 100 within and through the bore drilled within the substrate will not be slowed or retarded. Accordingly, the thread cutting, forming, or tapping upon or within the internal peripheral surface portion of the substrate will proceed in a properly controlled, smooth manner so as to properly define the female threads within the internal peripheral surface portion of the substrate in a properly controlled progressive manner. Ultimately, when the forward end or tip portion of the self-tapping fastener pierces the back or inner side surface of the substrate, the dust, debris, particles, or the like, will effectively be discharged from the recesses or pockets defined within the flat sections 112,114 and out the back or inner side surface of the substrate. Accordingly, the self-tapping fastener 100 will exhibit good pull-out resistance values or forces when in fact inserted and installed within the substrate.

With reference lastly being made to FIGS. 3 and 4, modified embodiments of the self-tapping fastener 100 as disclosed within FIG. 1, are respectively disclosed and are generally indicated by the reference characters 100' and 100". The only significant differences between the modified embodiments of the self-tapping fasteners 100',100" as respectively disclosed within FIGS. 3 and 4, and as considered with respect to the original self-tapping fastener 100 as disclosed within FIG. 1, resides in the forward tip portions thereof, and accordingly, the discussions of the modified embodiments of the self-tapping fasteners 100',100" as disclosed within FIGS. 3 and 4 will be confined to such differences. In addition, component parts of the modified self-tapping fasteners 100',100", which correspond to the component parts of the self-tapping fastener 100, will be designated by corresponding reference characters except that markings (') or (") will be used in conjunction therewith.

Accordingly, considering the first modified self-tapping fastener 100' as illustrated within FIG. 3, it is seen that in lieu of the flat or planar forward end tip portion 120 characteristic of the self-tapping fastener 100 as disclosed within FIG. 1, wherein the forward end or tip portion 120 extends within a radial plane substantially perpendicular to the longitudinal axis of the self-tapping fastener 100, the forward end or tip portion 120' of the first modified self-tapping fastener 100' has a substantially conical configuration. The provision of such a conically-shaped tip portion 120' facilitates the entry of the self-tapping fastener 100' into the bore drilled into the substrate, and into which the self-tapping fastener 100' is to be inserted and affixed, as a result of effectively guiding the forward end portion of the self-tapping fastener 100" into the drilled bore. It is noted that both the primary and secondary thread leads 108',110' terminate at an axial location upstream of the terminal or pointed end of the conically-shaped tip portion 120', and in addition, in lieu of the recessed flats, exemplified by means of the flat 112', terminating at the forward end or tip portion as was characteristic of the flats 112,114 in connection with the forward end or tip portion 120 of the self-tapping fastener 100, it is likewise seen that the flats, again, as exemplified by means of the flat 112', also terminates at an axial location upstream of the terminal or pointed end of the conically-shaped tip portion 120'. It is also to be noted that due to the conical configuration of the forward end tip portion 120' of the self-tapping fastener 100', that portion of, for example, the flat 112' which is actually disposed upon the conically-shaped forward end tip portion 120' will not actually be within the same axially oriented plane as that portion of the flat 112' which is actually disposed upon the side surface portion of the shank portion 104' of the self-tapping fastener 100' due to the formation of the conically-shaped forward end tip portion 120'. In other words, while the flat 112' will effectively extend onto the conically-shaped forward end tip portion 120', it will effectively follow the contours of the external surface portions of the conically-shaped forward end tip portion 120'.

In a similar manner, with respect to the second modified self-tapping fastener 100" as disclosed within FIG. 4, it is seen that the forward end or tip portion 120" of the second modified self-tapping fastener 100" is likewise tapered with respect to the shank portion 104", however, instead of being truly conically-shaped as was the forward end or tip portion 120' of the first modified self-tapping fastener 100' as disclosed within FIG. 3, the forward end or tip portion 120" of the second modified self-tapping fastener 100" has a frusto-conical configuration. Accordingly, while such frusto-conically shaped forward end or tip portion 120" of the second modified self-tapping fastener 100" can also facilitate the entry of the self-tapping fastener 100" into the bore drilled into the substrate, and into which the self-tapping fastener 100" is to be inserted and affixed, as a result of effectively guiding the forward end portion of the second modified self-tapping fastener 100" into the drilled bore, the additional operational advantage of the second modified self-tapping fastener 100" with respect to the first modified self-tapping fastener 100' resides in the fact that the first primary and second secondary thread leads 108",110" are able to be continued to axial positions which are substantially adjacent to, or within the immediate vicinity of, the terminal end surface of the frusto-conically shaped forward end or tip portion 120".

In this manner, the forwardmost thread portion of the primary thread lead 108" can begin to center the second modified self-tapping fastener 100" within the drilled bore, almost immediately after the forward end tip portion 120" has been inserted into the drilled bore, so as to properly facilitate the commencement of the self-tapping process. It is to be noted that the thread formation, comprising, for example, the forwardmost thread portions of the first primary and second secondary thread leads 108", 110", onto or in conjunction with the frusto-conically shaped forward end tip portion 120" of the self-tapping fastener 100" is achieved by means of different dies than those used to form the first primary and second secondary thread leads 108',110' onto or in conjunction with the conically-shaped forward end tip portion 120' of the first modified self-tapping fastener 100', however, the thread forming process used in connection with the second modified self-tapping fastener 100" is somewhat more expensive.

Thus, it may be seen that in accordance with the principles and teachings of the present invention, there has been disclosed a new and improved self-tapping fastener wherein the self-tapping fastener comprises a shank portion which is provided with a dual thread structure comprising, in effect, a primary thread lead and a secondary thread lead, and the forward end portion of the shank portion of the self-tapping fastener is provided with a pair of diametrically opposed flat sections which effectively form or define a pair of diametrically opposed cutting, tapping, or forming threads from the primary thread lead. In this manner, despite encountering or undergoing some abrasion of the forwardmost primary thread lead portions of the self-tapping fastener as a result of the self-tapping process within the particular substrate, the provision of the redundant cutting, tapping, or forming threads permits the self-tapping fastener to in fact perform and complete the thread cutting, tapping or forming process such that the self-tapping fastener will exhibit good pull-out resistance or force values, characteristics, or parameters. In addition, the flat sections also effectively accommodate any dust, particles, debris, or the like, which will be generated during the thread tapping process depending upon the particular substrate into which the self-tapping fastener is being inserted and installed, until, for example, the forward end or tip portion of the self-tapping fastener pierces the back or inner side surface of the stucco, gypsum, wallboard, or other hard board substrate, whereby such dust, particles, debris, or the like, can then be discharged from the back or inner side of the stucco, gypsum, wall board, or other hard board substrate.

Obviously, many variations and modifications of the present invention are possible in light of the above teachings. For example, while a pair of the flats 112,114 has been disclosed in accordance with the preferred embodiment, the self-tapping fastener 100 could be provided with only a single flat. In addition, depending upon the axial length or extent of the single flat, one or more axially spaced cutting, forming, or self-tapping threads may be formed upon the shank portion of the self-tapping fastener depending upon, for example, various parameters of the particular substrate, such as, for example, its hardness, its abrasiveness, and the like. It is therefore to be understood that within the scope of the appended claims, the present invention may be practiced otherwise than as specifically described herein.

What is claimed as new and desired to be protected by Letters Patent of the United States of America, is:

1. A self-tapping fastener for forming threads within a substrate, comprising:
   a head portion;
   an axially oppositely disposed forward end tip portion;
   a shank portion extending from said head portion to said forward end tip portion;
   at least one self-tapping thread lead defined upon said shank portion for forming female threads within a substrate, wherein said at least one thread lead comprises a plurality of successive threads axially spaced from each other by means of a predetermined pitch; and
   a pair of flats formed upon diametrically opposed external surface portions of said shank portion of said self-tapping fastener for defining discontinuous portions within said at least one thread lead, wherein said pair of flats extend axially rearwardly from said forward end tip portion of said shank portion of said fastener so as to effectively intercept at least two of said plurality of threads, wherein said discontinuous portions of said at least one thread lead circumferentially overlap said pair of flats so as to define transition regions from said pair of flats to said at least one thread lead in order to define cutting edge portions upon said at least one thread lead as well as undercut portions located between each of said cutting edge portions and said pair of flats, wherein said pair of flats provide for the escape of debris generated during thread-cutting operations, wherein said circumferentially overlapped transition regions of said plurality of threads have semi-circular cross-sectional configurations so as to define cutting edge portions which will provide said cutting edge portions with reduced torque levels for optimizing the self-tapping threading of said fastener within a substrate, and wherein, in light of the interception of said pair of flats with at least two of said plurality of threads, at least four cutting edge portions of said self-tapping threads, comprising two pairs of diametrically opposite self-tapping threads, are formed upon said fastener so as to effectively provide built-in redundancy for preserving said self-tapping properties of said plurality of threads.

2. The self-tapping fastener as set forth in claim 1, wherein:
   said at least one thread lead comprises a dual thread lead comprising a first primary thread lead and a second secondary thread lead wherein the crest-to-crest diametrical extent of said first primary thread lead is greater than the crest-to-crest diametrical extent of said second secondary thread lead.

3. The self-tapping fastener as set forth in claim 2, wherein:
   successive threads of said first primary thread lead are interposed between successive threads of said second secondary thread lead, and successive threads of said second secondary thread lead are interposed between successive threads of said first primary thread lead.

4. The self-tapping fastener as set forth in claim 1, wherein:
   said at least one thread lead has a predetermined crest-to-crest diametrical extent; and
   the diametrical spacing between said pair of diametrically opposed flats, formed upon said diametrically opposed external side surface portions of said shank portion of said self-tapping fastener, is within the range of 35-65% of said predetermined crest-to-crest diametrical extent of said at least one thread lead.

5. A self-tapping fastener for forming threads within a substrate, comprising:
   a head portion;
   an axially oppositely disposed forward end tip portion;
   a shank portion extending from said head portion to said forward end tip portion;
   at least one self-tapping thread lead defined upon said shank portion for forming female threads within a substrate, wherein said at least one thread lead comprises a plurality of successive threads axially spaced from each other by means of a predetermined pitch; and
   a pair of flats formed upon diametrically opposed external surface portions of said shank portion of said self-tapping fastener for defining a pair of recessed pockets for physically accommodating dust particles generated during the self-tapping of said self-tapping fastener into the substrate such that the dust particles do not interfere with and retard the self-tapping process of said self-tapping fastener, and wherein said pair of flats extend axially rearwardly from said forward end tip portion of said shank portion of said fastener so as to effectively intercept at least two of said plurality of threads, wherein said pair of flats formed upon said diametrically opposed external surface portions of said shank portion of said self-tapping fastener also define discontinuous portions within said at least one thread lead such that said discontinuous portions of said at least one thread lead circumferentially overlap said pair of flats so as to define transition regions from said pair of flats to said at least one thread lead in order to define cutting edge portions upon said at least one thread lead as well as undercut portions located between each of said cutting edge portions and said pair of flats, wherein said circumferentially overlapped transition regions of said plurality of threads have semi-circular cross-sectional configurations so as to define cutting edge portions which will provide said cutting edge portions with reduced torque levels for optimizing the self-tapping threading of said fastener within a substrate, and wherein in light of the interception of said pair of flats with at least two of said plurality of threads, at least four cutting edge portions of said self-tapping threads, comprising two pairs of diametrically opposite self-tapping threads, are formed upon said fastener so as to effectively provide built-in redundancy for preserving said self-tapping properties of said plurality of threads.

6. The self-tapping fastener as set forth in claim 5, wherein:
   said at least one thread lead has a predetermined crest-to-crest diametrical extent; and
   the diametrical spacing between said pair of diametrically opposed flats, formed upon said diametrically opposed external side surface portions of said shank portion of said self-tapping fastener, is within the range of 35-65% of said predetermined crest-to-crest diametrical extent of said at least one thread lead.

7. The self-tapping fastener as set forth in claim 5, wherein:
   said at least one thread lead comprises a dual thread lead comprising a first primary thread lead and a second secondary thread lead wherein the crest-to-crest diametrical extent of said first primary thread lead is greater than the crest-to-crest diametrical extent of said second secondary thread lead.

8. The self-tapping fastener as set forth in claim 7, wherein:
   successive threads of said first primary thread lead are interposed between successive threads of said second secondary thread lead, and successive threads of said second secondary thread lead are interposed between successive threads of said first primary thread lead.

* * * * *